(12) United States Patent
Sato

(10) Patent No.: US 11,016,753 B2
(45) Date of Patent: May 25, 2021

(54) FLAW HANDLING SYSTEM, AND HANDLING METHOD AND PROGRAM FOR FLAW HANDLING SYSTEM

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/788,721

(22) Filed: Feb. 12, 2020

(65) Prior Publication Data
US 2020/0293301 A1    Sep. 17, 2020

(30) Foreign Application Priority Data

Mar. 13, 2019 (JP) .............................. JP2019-046206

(51) Int. Cl.
*G06F 8/65* (2018.01)
(52) U.S. Cl.
CPC ...................... *G06F 8/65* (2013.01)
(58) Field of Classification Search
USPC .......................................................... 717/173
See application file for complete search history.

(56) References Cited

U.S. PATENT DOCUMENTS

| | | | | |
|---|---|---|---|---|
| 2010/0325623 | A1* | 12/2010 | Ikeda | G06F 8/65 717/173 |
| 2011/0131562 | A1* | 6/2011 | Tanaka | G06F 8/61 717/168 |
| 2020/0241501 | A1* | 7/2020 | Nakanishi | G06Q 10/06 |
| 2020/0241502 | A1* | 7/2020 | Nakanishi | G05B 19/4083 |

FOREIGN PATENT DOCUMENTS

JP    2000-099123 A    4/2000

OTHER PUBLICATIONS

Tanya M. Anandan; "Demystifying Robot Offline Programming"; Robotics.org website [full url in ref.]; Sep. 21, 2018 (Year: 2018).*

(Continued)

*Primary Examiner* — Qing Chen
*Assistant Examiner* — Clint Thatcher
(74) *Attorney, Agent, or Firm* — Sughrue Mion, PLLC

(57) ABSTRACT

A flaw handling system includes an off-line management server configured to manage an off-line robot and a data analysis server configured to determine whether or not an in-line robot can be updated using update-software. The off-line management server installs the update-software transmitted from a manufacturer's server in the off-line robot corresponding to the in-line robot, evaluates the update-software, and transmits a result of the evaluation of the update-software to the data analysis server. When the data analysis server determines that it is impossible to update the in-line robot using the update-software based on the result of the evaluation of the update-software by the off-line management server, the data analysis server transmits a result of the determination that the update using the update-software is impossible and the result of the evaluation of the update-software to the manufacturer's server.

5 Claims, 4 Drawing Sheets

(56) References Cited

OTHER PUBLICATIONS

Alex Owen-Hill; "What Are the Different Programming Methods for Robots?"; Robotiq.com website [full url in ref.]; May 5, 2016 (Year : 2016).*

Abdul Montaqim; "Offline Programming Software for Industrial Robots from RoboDK Offers Hundreds of Virtual Industrial Robots from Top Robotics Companies"; RoboticsAndAutomationNews.com website [full url in ref.]; Jul. 14, 2015 (Year: 2015).*

* cited by examiner

FLAW HANDLING SYSTEM, AND HANDLING METHOD AND PROGRAM FOR FLAW HANDLING SYSTEM

CROSS REFERENCE TO RELATED APPLICATIONS

This application is based upon and claims the benefit of priority from Japanese patent application No. 2019-046206, filed on Mar. 13, 2019, the disclosure of which is incorporated herein in its entirety by reference.

BACKGROUND

The present disclosure relates to a flaw handling system that performs, when a flaw (e.g., a software bug) occurs in update-software of a robot, a process of handling the flaw, and a handling method and a program for the flaw handling system.

When updating software installed in a robot disposed at a production line, update-software delivered from a manufacturer is installed in a robot for evaluating the software (hereinafter also referred to as an evaluation robot), and whether or not a flaw has occurred in the update-software is monitored.

When a flaw occurs in the update-software, it is handled by the manufacturer of the software, and hence the user himself/herself needs to extract data on the flaw and transmit it to the manufacturer, which involves the taking of an extra number of operational steps therefor.

To deal with such a problem, a system for externally outputting a control program or the like when a malfunction occurs in a robot (see, for example, Japanese Unexamined Patent Application Publication No. 2000-099123) is known. However, this system does not transmit the control program to the manufacturer. It merely transmits the control program or the like to a terminal of an in-house special department or the like.

The present disclosure has been made to solve the aforementioned problem and an object thereof is to provide a flaw handling system capable of reducing, when a flaw occurs in update-software, the number of steps in the process of handling the flaw, and a handling method and a program for the flaw handling system.

SUMMARY

A first exemplary aspect of the present disclosure for achieving the aforementioned object is a flaw handling system including:

an off-line management server configured to manage an off-line robot that is not used in a production line of a factory; and a data analysis server configured to determine whether or not an in-line robot disposed at the production line of the factory can be updated using update-software, in which the off-line management server installs the update-software transmitted from a manufacturer's server in the off-line robot corresponding to the in-line robot, evaluates the update-software, and transmits a result of the evaluation of the update-software to the data analysis server, and when the data analysis server determines that it is impossible to update the in-line robot using the update-software based on the result of the evaluation of the update-software by the off-line management server, the data analysis server transmits the result of the determination that the update of the in-line robot using the update-software is impossible and the result of the evaluation of the update-software to the manufacturer's server.

According to the second exemplary aspect of the present disclosure, the off-line management server may include: a software management unit configured to instruct the off-line robot corresponding to the in-line robot to be updated to output backup data to a data storage unit based on information of the in-line robot to be updated transmitted from the data analysis server; a data storage unit configured to store the backup data of the off-line robot; an evaluation unit configured to evaluate the update-software of the off-line robot; and a time measurement unit configured to measure updating time of the off-line robot by the update-software.

According to the third exemplary aspect of the present disclosure, the data analysis server may include: a data transmission/reception unit configured to receive the update-software from the manufacture's server and transmit the result of the determination that the update using the update-software is impossible and the result of the evaluation of the update-software to the manufacturer's server; a robot search unit configured to search for the in-line robot to be updated based on information of the update-software output from the data transmission/reception unit and transmit information of the found in-line robot to be updated to the off-line management server; and an update availability determination unit configured to determine whether or not it is possible to update the in-line robot using the update-software based on the updating time and the result of the evaluation of the update-software transmitted from the off-line management server.

A fourth exemplary aspect of the present disclosure for achieving the aforementioned object may be a method of handling a flaw in a flaw handling system, the flaw handling system including:

an off-line management server configured to manage an off-line robot that is not used in a production line of a factory; and a data analysis server configured to determine whether or not an in-line robot disposed at the production line of the factory can be updated using update-software, the method including:

installing, by the off-line management server, the update-software transmitted from a manufacturer's server in the off-line robot corresponding to the in-line robot, evaluating the update-software, and transmitting a result of the evaluation of the update-software to the data analysis server; and transmitting, by the data analysis server, when the data analysis server determines that it is impossible to update the in-line robot using the update-software based on the result of the evaluation of the update-software by the off-line management server, a result of the determination that the update using the update-software is impossible and the result of the evaluation of the update-software to the manufacturer's server.

A fifth exemplary aspect of the present disclosure for achieving the aforementioned object may be a program for a flaw handling system, the flaw handling system including:

an off-line management server configured to manage an off-line robot that is not used in a production line of a factory, and a data analysis server configured to determine whether or not an in-line robot disposed at the production line of the factory can be updated using update-software, the program being adapted to cause a computer to execute processes of:

installing, by the off-line management server, the update-software transmitted from a manufacturer's server in the off-line robot corresponding to the in-line robot, evaluating the update-software, and transmitting a result of the evaluation of the update-software to the data analysis server, and transmitting, by the data analysis server, when the data analysis server determines that it is impossible to update the in-line robot using the update-software based on the result of the evaluation of the update-software by the off-line management server, the result of the determination that the update using the update-software is impossible and the result of the evaluation of the update-software to the manufacturer's server.

According to the present disclosure, it is possible to provide a flaw handling system capable of reducing, when a flaw occurs in update-software, the number of steps in the process of handling the flaw, and a handling method and a program for the flaw handling system.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, embodiments of the present disclosure are explained with reference to the drawings. When updating a software of an in-line robot disposed at a production line, it is necessary to evaluate beforehand whether or not there is a flaw in a software transmitted from a manufacturer's server (hereinafter referred to as update-software).

Therefore, the update-software is evaluated using an off-line robot that is not used in the production line. When a flaw occurs in the update-software, it is handled by the manufacturer of the software, and hence the user him/herself needs to extract data on the flaw and transmit it to the manufacturer, which involves the taking of an extra number of operational steps therefor.

On the other hand, in a flaw handling system according to an embodiment of the present disclosure, the update-software transmitted from the manufacturer's server is installed in the off-line robot corresponding to the in-line robot, and the update-software is evaluated. The flaw handling system determines whether or not the in-line robot can be updated using the update-software based on the result of the evaluation of the update-software. When the flaw handling system determines that it is impossible to update the in-line robot using the update-software, it transmits the result of the determination that it is impossible to update the in-line robot using the update-software and the result of the evaluation of the update-software to the manufacturer's server.

Accordingly, it is possible to automatically transmit the result of the determination that it is impossible to update the in-line robot using the update-software and the result of the evaluation of the update-software to the manufacturer's server when it is determined a flaw has occurred in the update-software and it is impossible to update the in-line robot using the update-software. Therefore, there is no need for the user him/herself to extract the data on the flaw and send the result of the evaluation of the flaw data to the manufacturer when a flaw occurs in the update-software, and thus, it is possible to reduce the number of steps in the process of handling the flaw.

Figure 1:
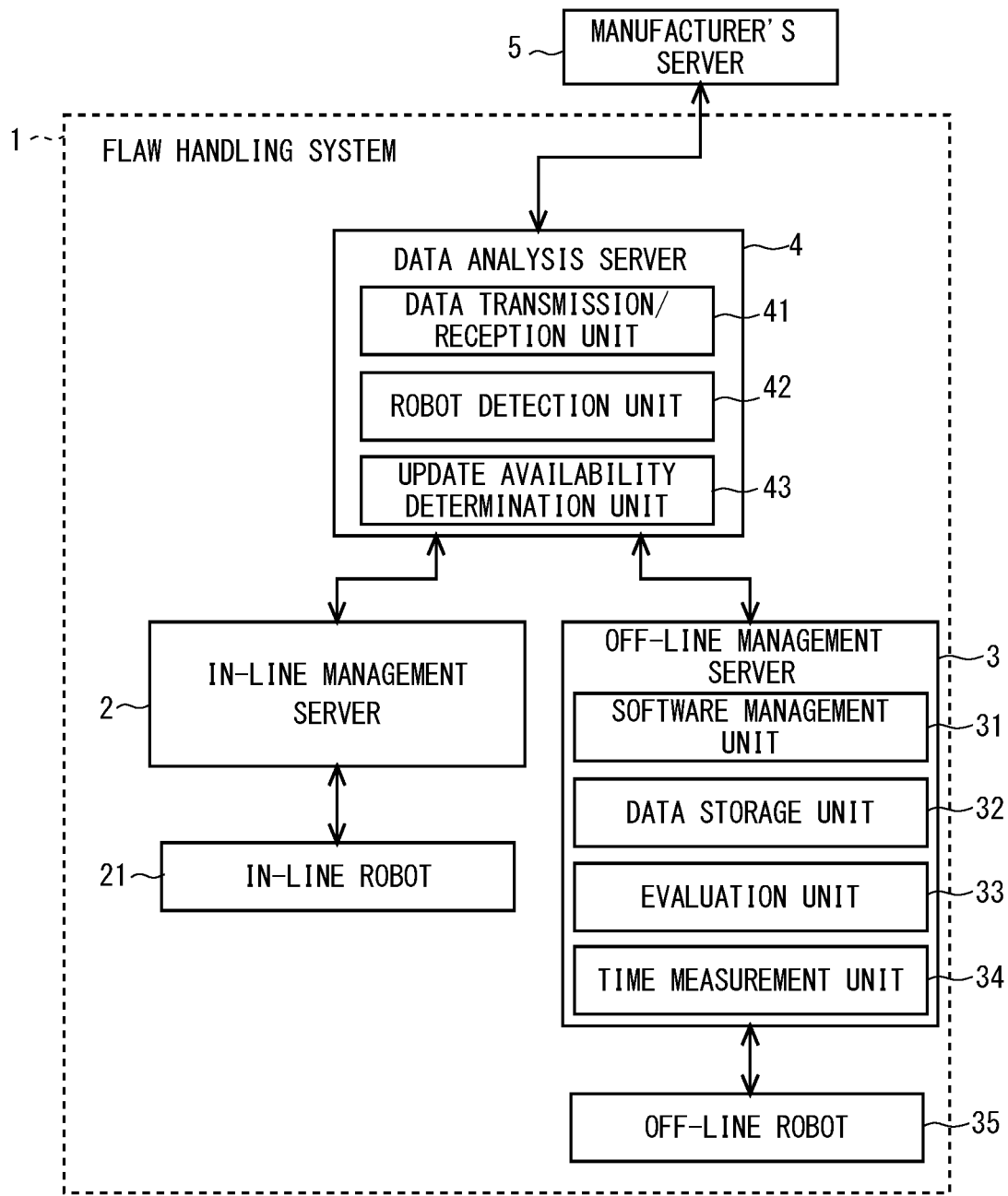
FIG. 1 is a block diagram schematically showing a system configuration of a flaw handling system according to an embodiment of the present disclosure.

FIG. 1 is a block diagram schematically showing a system configuration of a flaw handling system according to an embodiment of the present disclosure. The flaw handling system 1 according to this embodiment includes an in-line management server 2, an off-line management server 3, and a data analysis server 4.

The in-line management server 2, the off-line management server 3, and the data analysis server 4 are mutually connected via a communication network such as the internet.

Each of the in-line management server 2, the off-line management server 3, and the data analysis server 4 has a hardware configuration in which a microcomputer is at the center, the microcomputer being configured of, for example, a CPU (Central Processing Unit) that performs operational processing etc., a memory such as a ROM (Read Only Memory) that stores the operational program etc. to be executed by the CPU or a RAM (Random Access Memory), and an interface unit (I/F) that inputs/outputs a signal to/from the outside. The CPU, the memory, and the interface unit are mutually connected via a data bus or the like.

First, the in-line management server 2 is explained. An in-line robot 21 is connected to the in-line management server 2 via a network or the like. The in-line management server 2 manages the in-line robot 21. The in-line management server 2 installs the update-software transmitted from the data analysis server 4 in the in-line robot 21.

Next, the off-line management server 3 is explained in detail. Off-line robots 35 are connected to the off-line management server 3 via a network or the like. The off-line management server 3 manages the off-line robots 35. The off-line robots 35 are, for example, non-mass production robots that are not used in the production line of vehicles or the like and hence do not take part in the production of vehicles or the like, robots used for education, robots for experiments/verifications, or the like.

The off-line management server 3 includes a software management unit 31 that manages the software of the off-line robots 35, a data storage unit 32 that stores backup data for each of the off-line robots 35, an evaluation unit 33 that evaluates the software of the off-line robots 35, and a time measurement unit 34 that measures the time taken for updating the software of each off-line robot 35.

The software management unit 31 instructs, based on information of an in-line robot 21 to be updated transmitted from the data analysis server 4, a corresponding off-line robot 35 to output backup data to the data storage unit 32.

The data storage unit 32 stores the backup data output from each off-line robot 35. The data storage unit 32 outputs a backup start signal to the time measurement unit 34 when backup of data of each off-line robot 35 is started. When the data backup of each off-line robot 35 has been completed, the data storage unit 32 outputs a backup completion signal to the evaluation unit 33.

Upon receiving the backup completion signal from the data storage unit 32, the evaluation unit 33 starts to install update-software and an evaluation program for evaluating the update-software in the off-line robot 35 to be updated.

The evaluation unit 33 installs, based on the information about the in-line robot 21 to be updated transmitted from the data analysis server 4, the update-software and the evaluation program in the corresponding off-line robot 35. When the installation of the update-software and the evaluation program has been completed, the evaluation unit 33 outputs an installation completion signal to the time measurement unit 34.

The evaluation unit 33 evaluates the update-software of the off-line robot 35 according to the evaluation program. The evaluation unit 33 evaluates the update-software of the off-line robot 35 according to, for example, the evaluation items mentioned below.

(1) The updating time of the software is equal to or longer than the prescribed time.

This is caused when the update process is interrupted, when there is a defect in the update file, when loading or updating of the program continues for a long time due to a programming error, etc.

(2) The update after the software update is wrong.

This occurs due to a programming error etc. causing the wrong specification.

(3) An overflow occurs in memory processing performed by the CPU.

This occurs when the memory of the CPU is cluttered etc. due to a programming error in the calculation processing part in the software.

(4) When the backup data is introduced, the volume of the data is too large to be stored.

This occurs when the capacity of the additional file of the update-software is large and loops occur in the file addition processing, causing abnormal additions of files, etc.

(5) An abnormal operation occurs due to a flaw in the software calculation processing.

This occurs when there is a programming error, when the order of the calculation processing is skipped due to the calculation processing cycle being faster than the processing speed of the CPU, etc.

(6) Other control programs are affected.

This occurs when the update-software encroaches on the area of the memory used by other programs.

Note that the aforementioned evaluation items are merely examples and the evaluation items are not limited to these examples. The user can set arbitral evaluation items in the evaluation unit 33. The evaluation unit 33 evaluates, for example, whether or not any of the aforementioned evaluation items holds true for the update-software according to the evaluation program.

The time measurement unit 34 measures the updating time taken from storing of the backup data of the off-line robot 35 in the data storage unit 32 until installment of the update-software in the off-line robot 35.

The time measurement unit 34 measures the updating time of the off-line robot 35 by, for example, starting measurement of the updating time when it receives the backup start signal from the data storage unit 32 and stopping measurement of the updating time when it receives the installment completion signal from the evaluation unit 33.

The off-line management server 3 transmits the updating time and the result of the evaluation of the update-software to the data analysis server 4.

Figure 2:
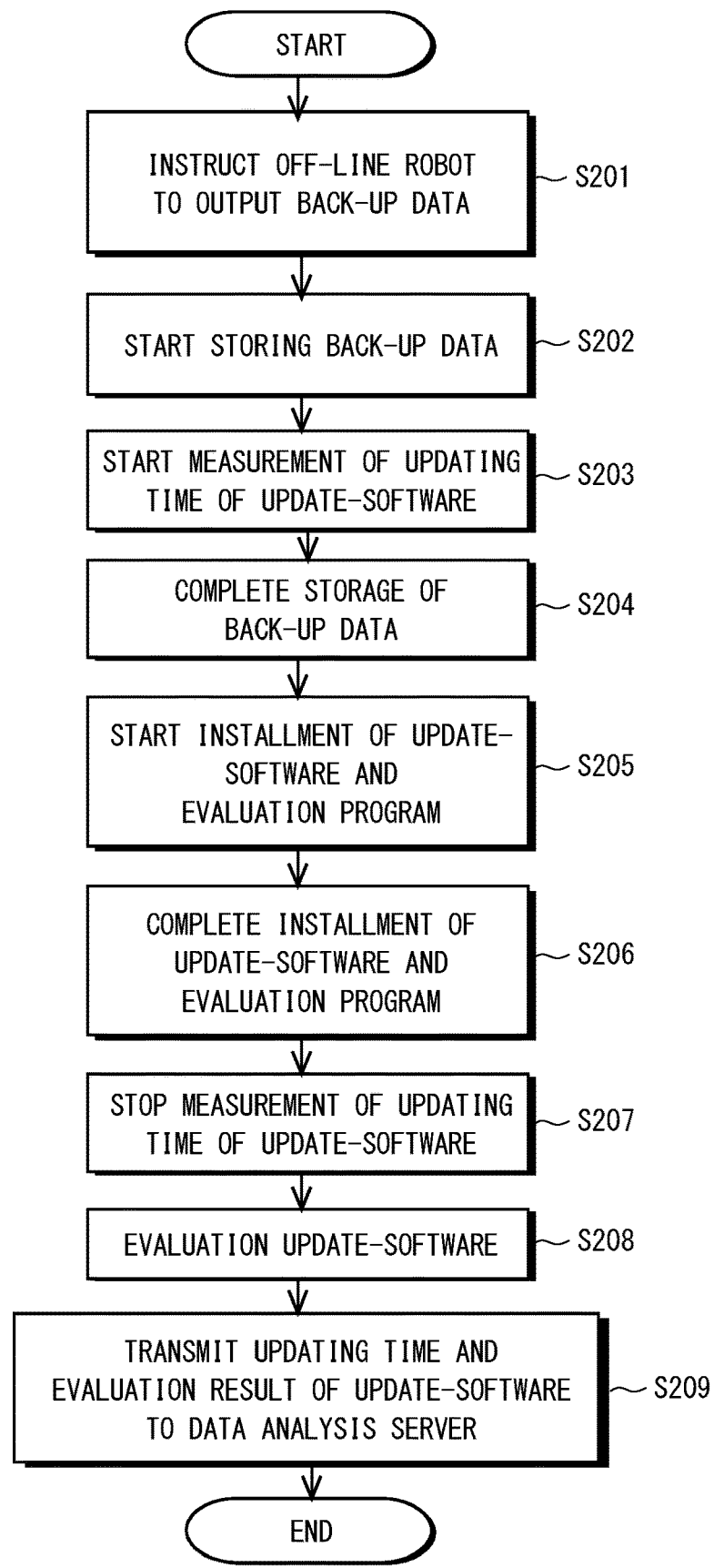
FIG. 2 is flowchart showing a flow of process performed by an off-line management server.

FIG. 2 is flowchart showing a flow of processing performed by the off-line management server 3. The software management unit 31 instructs the off-line robot 35 corresponding to the in-line robot 21, which is the robot to be updated, to output the backup data based on the information regarding the in-line robot 21 transmitted from the data analysis server 4 (Step S201). The off-line robot 35 outputs the backup data in response to the output instruction signal from the software management unit 31.

The data storage unit 32 starts storing the backup data output from the off-line robot 35 (Step S202).

The time measurement unit 34 receives a backup start signal from the data storage unit 32 and starts measuring the updating time of the update-software (Step S203).

The data storage unit 32 outputs the backup completion signal to the evaluation unit 33 when storage of the backup data of the off-line robot 35 is completed (Step S204).

The evaluation unit 33 starts installment of the update-software and the evaluation program in the off-line robot 35 corresponding to the in-line robot to be updated when it receives the backup completion signal from the data storage unit 32 (Step S205).

The evaluation unit 33 outputs the installment completion signal to the time measurement unit 34 when installment of the update-software and the evaluation program is completed (Step S206).

The time measurement unit 34 stops measurement of the updating time when it receives the installment completion signal from the evaluation unit 33 (Step S207).

The evaluation unit 33 evaluates the update-software according to the evaluation program (Step S208).

The off-line management server 3 transmits the updating time and the result of the evaluation of the update-software to the data analysis server 4 (Step S209).

Next, the data analysis server 4 is explained in detail. The data analysis server 4 is a server that determines whether or not it is possible to update the in-line robot using the update-software. The data analysis server 4 includes a data transmission/reception unit 41 that transmits/receives data to/from a manufacturer's server 5, a robot search unit 42 that searches for the in-line robot 21, and an update availability determination unit 43 that determines whether or not the in-line robot can be updated using the update-software.

The data transmission/reception unit 41 receives the software information regarding the in-line robot 21 to be updated transmitted from the manufacturer's server 5. The software information includes the update-software, version information of the update-software, and information regarding the free memory capacity required for the update-software. The data transmission/reception unit 41 outputs the software information received from the manufacturer's server 5 to the robot search unit 42.

The robot search unit 42 searches for the in-line robot 21, which is the robot to be updated, based on the software information output from the data transmission/reception unit 41. The robot search unit 42 transmits the information regarding the searched in-line robot 21, which is the robot to be updated, to the off-line management server 3.

The update availability determination unit 43 determines whether or not it is possible to update the in-line robot using the update-software based on the updating time and the result of the evaluation of the update-software transmitted from the off-line management server 3. The update availability determination unit 43 determines that it is impossible to update the in-line robot using the update-software when, for example, the update-software comes under at least one of the evaluation items in the result of the evaluation transmitted from the off-line management server 3.

The update availability determination unit 43 outputs the result of the determination that it is impossible to update the in-line robot using the update-software and the result of the evaluation of the update-software to the data transmission/reception unit 41 when it determines that it is impossible to update the in-line robot using the update-software.

The data transmission/reception unit 41 transmits the result of the determination that it is impossible to update the in-line robot using the update-software and the result of the evaluation of the update-software to the manufacturer's server 5 as an evaluation report of the update-software. The manufacturer can investigate the flaw in the update-software based on the result of the determination that it is impossible to update the in-line robot using the update-software and the result of the evaluation of the update-software received by the manufacturer's server 5 and take an appropriate countermeasure against the flaw.

Figure 3:
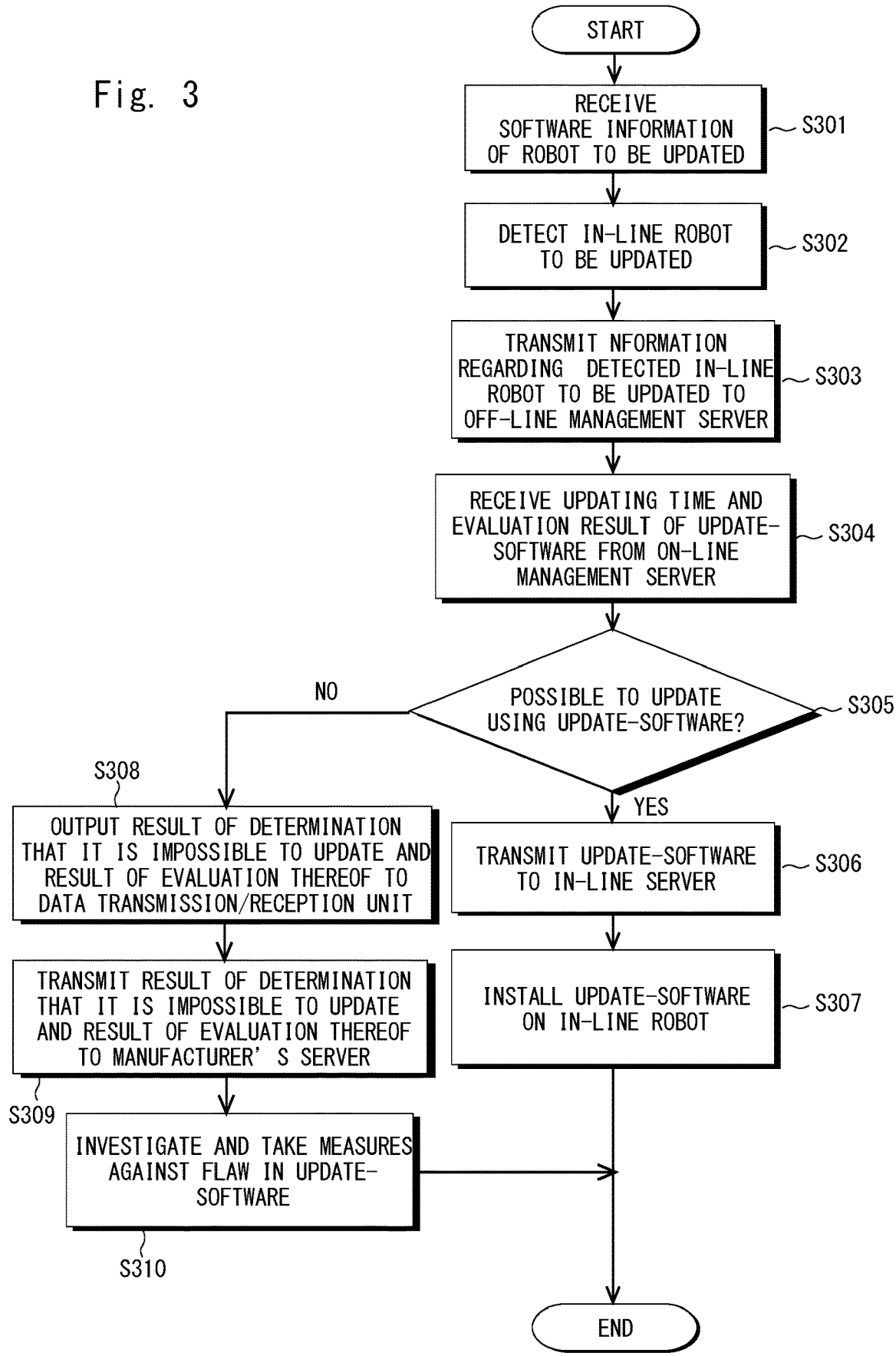
FIG. 3 is a flowchart showing a flow of process performed by a data analysis server.

FIG. 3 is a flowchart showing a flow of process performed by the data analysis server. The data transmission/reception unit 41 of the data analysis server 4 receives the software information regarding the in-line robot 21 to be updated transmitted from the manufacturer's server 5 (Step S301).

The robot search unit 42 searches for the in-line robot 21 to be updated based on the software information output from the data transmission unit (Step S302).

The robot search unit 42 transmits the information regarding the searched in-line robot 21 to be updated to the off-line management server 3 (Step S303).

The update availability determination unit 43 receives the updating time and the result of the evaluation of the update-software from the on-line management server 3 (Step S304).

The update availability determination unit 43 determines whether or not it is possible to update the in-line robot using the update-software based on the updating time and the result of the evaluation of the update-software transmitted from the off-line management server 3 (Step S305).

When the update availability determination unit 43 determines that it is possible to update the in-line robot using the update-software (Step S305 YES), it transmits the update-software to the in-line management server 2 (Step S306). The in-line management server 2 installs the update-software transmitted from the update availability determination unit 43 in the in-line robot 21 (Step S307).

Alternatively, when the update availability determination unit 43 determines that it is impossible to update the in-line robot using the update-software (Step S305 NO), it outputs the result of the determination that it is impossible to update the in-line robot and the result of an evaluation of the update-software to the data transmission/reception unit 41 (Step S308).

The data transmission/reception unit 41 transmits the result of the determination that it is impossible to update the in-line robot using the update-software and the result of the evaluation of the update-software to the manufacturer' server 5 (Step S309).

The manufacturer investigates the flaw in the update-software and takes a countermeasure against the flaw based on the result of the determination that it is impossible to update the in-line robot using the update-software and the result of the evaluation of the update-software received by the manufacturer's server 5 (Step S310).

As described above, in the flaw handling system 1 according to this embodiment, the off-line management server 3 installs the update-software transmitted from the manufacturer's server 5 in the off-line robot 35 corresponding to the in-line robot 21 and performs an evaluation of the update-software. The data analysis server 4 transmits the result of the determination that it is impossible to update the in-line robot using the update-software and the result of the evaluation of the update-software to the manufacturer' server 5 when it determines that it is impossible to update the in-line robot using the update-software based on the result of the evaluation of the update-software performed by the off-line management server 3.

By this configuration, it is possible to automatically transmit the result of the determination that it is impossible to update the in-line robot using the update-software and the result of the evaluation of the update-software to the manufacturer when a flaw occurs in the update-software. Accordingly, it is possible to reduce the number of steps in handling such a flaw when it occurs in the update-software.

Several embodiments of the present disclosure have been explained, and they are mentioned merely as examples and are not intended to limit the scope of the present disclosure. These noble embodiments may be implemented in various other modes and can be omitted, replaced, or changed in various ways without departing from the gist of the present disclosure. These embodiments and modification thereof are included in the scope and gist of the present disclosure and the scope of the invention recited in the claims and its equivalents.

Figure 4:
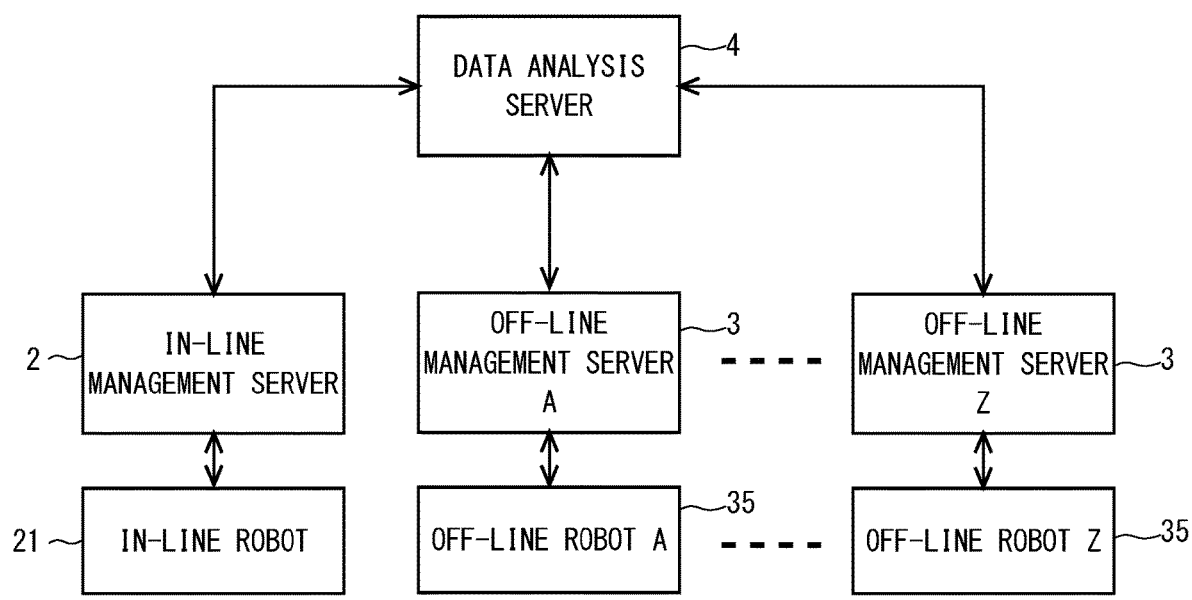
FIG. 4 is diagram showing a configuration including a plurality of off-line management servers.

In the aforementioned embodiments, a flaw handling system 10 may include, for example, a plurality of off-line management servers 3 as shown in FIG. 4. Further, the flaw handling system 10 may include a plurality of in-line management servers 2.

The present disclosure may be realized by having the CPU execute a computer program causing a computer to execute the processes shown in FIGS. 2 and 3.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (Programmable ROM), EPROM (Erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. From the disclosure thus described, it will be obvious that the embodiments of the disclosure may be varied in many ways.

Such variations are not to be regarded as a departure from the spirit and scope of the disclosure, and all such modifications as would be obvious to one skilled in the art are intended for inclusion within the scope of the following claims.

What is claimed is:

1. A flaw handling system comprising:
an off-line management server configured to manage an off-line robot that is not used in a production line of a factory; and
a data analysis server configured to determine whether or not an in-line robot disposed at the production line of the factory can be updated using update-software, wherein
the off-line management server installs the update-software transmitted from a manufacturer's server in the off-line robot corresponding to the in-line robot, evaluates the update-software, and transmits a result of the evaluation of the update-software to the data analysis server, and when the data analysis server determines that it is impossible to update the in-line robot using the update-software based on the result of the evaluation of the update-software by the off-line management server, the data analysis server transmits a result of the determination that the update of the in-line robot using the update-software is impossible and the result of the evaluation of the update-software to the manufacturer's server.

2. The flaw handling system according to claim 1, wherein the off-line management server comprises:
   a software management unit configured to instruct the off-line robot corresponding to the in-line robot to be updated to output backup data to a data storage unit based on information of the in-line robot to be updated transmitted from the data analysis server;
   a data storage unit configured to store the backup data of the off-line robot;
   an evaluation unit configured to evaluate the update-software of the off-line robot; and
   a time measurement unit configured to measure updating time of the off-line robot by the update-software.

3. The flaw handling system according to claim 1, wherein the data analysis server comprises:
   a data transmission/reception unit configured to receive the update-software from the manufacture's server and transmit the result of the determination that the update using the update-software is impossible and the result of the evaluation of the update-software to the manufacturer's server;
   a robot search unit configured to search for the in-line robot to be updated based on information of the update-software output from the data transmission/reception unit and transmit information of the found in-line robot to be updated to the off-line management server; and
   an update availability determination unit configured to determine whether or not it is possible to update the in-line robot using the update-software based on the updating time and the result of the evaluation of the update-software transmitted from the off-line management server.

4. A method of handling a flaw in a flaw handling system, the flaw handling system comprising:

an off-line management server configured to manage an off-line robot that is not used in a production line of a factory; and
a data analysis server configured to determine whether or not an in-line robot disposed at the production line of the factory can be updated using update-software,
the method comprising:
installing, by the off-line management server, the update-software transmitted from a manufacturer's server in the off-line robot corresponding to the in-line robot, evaluating the update-software, and transmitting a result of the evaluation of the update-software to the data analysis server; and
transmitting, by the data analysis server, when the data analysis server determines that it is impossible to update the in-line robot using the update-software based on the result of the evaluation of the update-software by the off-line management server, a result of the determination that the update using the update-software is impossible and the result of the evaluation of the update-software to the manufacturer's server.

5. A non-transitory computer readable medium storing a program for a flaw handling system, the flaw handling system comprising:
   an off-line management server configured to manage an off-line robot that is not used in a production line of a factory, and
   a data analysis server configured to determine whether or not an in-line robot disposed at the production line of the factory can be updated using update-software,
   the program being adapted to cause a computer to execute processes of:
   installing, by the off-line management server, the update-software transmitted from a manufacturer's server in the off-line robot corresponding to the in-line robot, evaluating the update-software, and transmitting a result of the evaluation of the update-software to the data analysis server, and
   transmitting, by the data analysis server, when the data analysis server determines that it is impossible to update the in-line robot using the update-software based on the result of the evaluation of the update-software by the off-line management server, a result of the determination that the update using the update-software is impossible and the result of the evaluation of the update-software to the manufacturer's server.

* * * * *